May 31, 1960     D. G. LA RUE ET AL     2,938,738
COMBINED HAND RIM AND WHEEL RIM FOR WHEEL CHAIRS
Filed Dec. 8, 1958
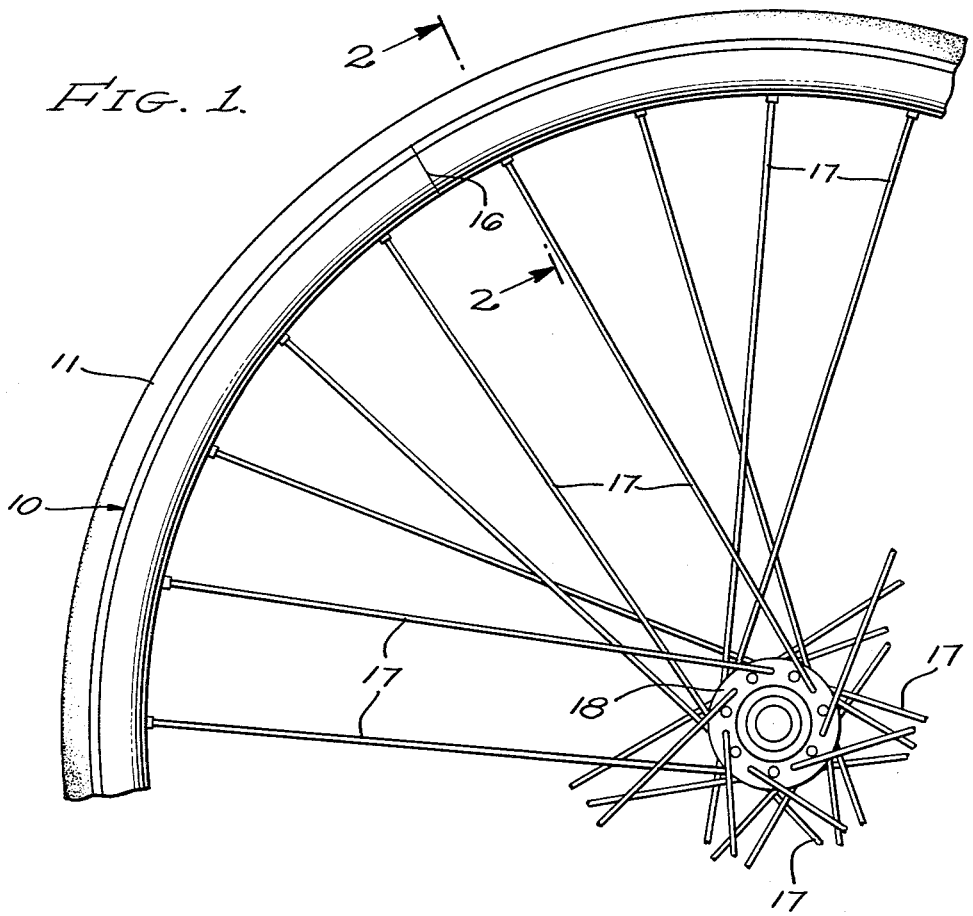
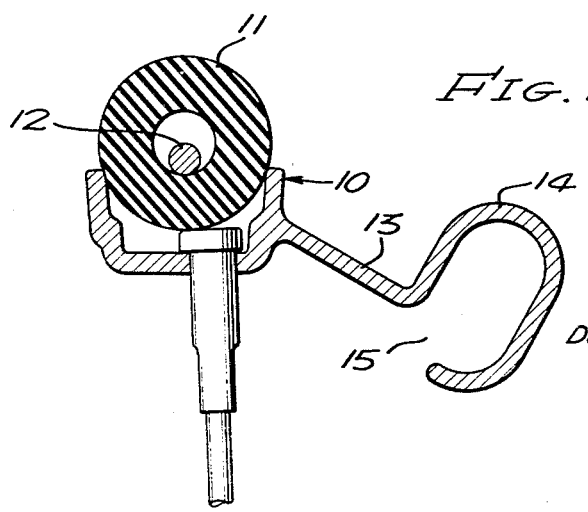
DONALD G. LA RUE
HERBERT H. BORUP
INVENTORS
BY Hazard & Miller
ATTORNEYS

United States Patent Office 2,938,738
Patented May 31, 1960

2,938,738

COMBINED HAND RIM AND WHEEL RIM FOR WHEEL CHAIRS

Donald G. La Rue and Herbert H. Borup, Oakland, Calif., assignors, by mesne assignments, to Everest & Jennings, Inc., Los Angeles, Calif., a corporation of California Filed Dec. 8, 1958, Ser. No. 778,899

2 Claims. (Cl. 280—249)

This invention relates to improvements in wheels for invalid wheel chairs, and to a method of making the same.

Explanatory of the present invention, the conventional invalid wheel chair is equipped with wheels having fellies on which rubber tires are usually mounted. Spaced laterally from the felly of the wheel chair there is usually a hand rim in the form of a metal ring. This hand rim is attached to the felly of the wheel usually by four equally spaced bolts surrounded by spacers. The bolts in turn are equipped with clamps which clamp about the felly of the wheel. There are certain objections to such a construction which include the catching of the fingers on the spacers with the result of possible injury either by the spacers themselves or sharp edges; the spacers frequently loosen and must be tightened; and in the course of usage the tires on such wheels tend to creep about the felly with the result that the clamps cut grooves in the sides of the tires.

An object of the present invention is to provide an improved wheel for invalid wheel chairs and a method of making the same wherein these objections can be overcome. In accordance with the present invention the felly and hand rim are connected to each other by an integral continuous web which can be readily produced by extruding metal such as aluminum to the desired cross-sectional shape. After having been produced in this manner, the felly, hand rim, and integral web can be bent into circular form and the ends welded or otherwise secured together. Such a construction is advantageous in that, as the connecting web is continuous there is no danger of catching or bruising fingers on the spaced spacers; there is no danger of the spacers or web loosening, and the clamps which cut the objectionable grooves in the tires are completely eliminated.

With the foregoing and other objects in view, which will be made manifest in the following detailed description and specifically pointed out in the appended claims, reference is had to the accompanying drawings for an illustrative embodiment of the invention, wherein:

Figure 1 is a view in side elevation of a portion of an invalid wheel chair wheel made in accordance with the present invention; and Fig. 2 is a sectional view taken substantially upon the line 2—2 upon Fig. 1.

Referring to the accompanying drawings wherein similar reference characters designate similar parts throughout, the improved wheel consists of a generally channel-shaped felly 10 which is so designed and so shaped as to receive the conventional rubber tire 11 within which there may be the conventional wire or cable 12. In accordance with the present invention, a continuous web 13 is formed integral with the channel or felly 10 and extends laterally therefrom and toward the center of the wheel. The outer end of this web has integral therewith a tubular extension 14 which is also continuous and which is curved or bent into the form of a suitable hand rim. This hand rim may be left open as indicated at 15, or the opening at 15 may be closed. The felly, web, and hand rim 14 are preferably formed by extruding the shape illustrated in Fig. 2 in an initially straight length. The extruded shape which includes the felly, web, and hand rim can then be circularly bent and the ends thereof welded or secured together as indicated at 16. Thereafter, the spokes 17 and hub 18 may be applied.

An invalid wheel chair wheel constructed in this manner has the advantage that the hand rim 14 is located at the proper location for use by the invalid and can be readily grasped at any point throughout its length. As the web 13 is continuous there are no spaced spacers or the equivalent that are apt to catch the fingers or bruise the hands of the user. As the hand rim and felly are integral with each other loosening of the hand rim with respect to the felly does not occur and as no clamps are employed to attach the hand rim or web to the felly no objectionable grooves are cut in the sides of the tire 11 as a result of the tire creeping relatively to the felly.

It will be noted that the channel, web, and hand rim all have the walls thereof of substantially equal or uniform thickness. While this is not essential it is frequently desirable as this arrangement facilitates extrusion of the metal to the desired shape.

It will be appreciated by those skilled in the art that an invalid wheel chair wheel manufactured in this manner can be very easily and economically produced in that the number of parts required to produce the combined felly, hand rim, and attaching means for the hand rim can be materially reduced.

Various changes may be made in the details of construction without departing from the spirit and scope of the invention as defined by the appended claims.

We claim:

1. A wheel for invalid wheel chairs and the like having a felly, a web integral with the side thereof extending laterally and toward the center of the wheel from a side of the felly, said web then extending to form a substantially closed loop forming a continuous hand rim parallel to the felly.

2. The method of forming invalid wheel chair wheels which consists of first producing a channel which is to form the felly of the wheel having integral therewith a web and a tubular hand rim, and bending the channel, web, and hand rim into circular form and securing their ends together.

References Cited in the file of this patent

UNITED STATES PATENTS

| | | |
|---|---|---|
| 2,034,824 | Nelson | Mar. 24, 1936 |
| 2,563,529 | Hawkins | Aug. 7, 1951 |
| 2,685,214 | Maud | Aug. 3, 1954 |
| 2,702,725 | Lyman | Feb. 22, 1955 |

FOREIGN PATENTS

| | | |
|---|---|---|
| 1,105,764 | France | July 6, 1955 |